US006687586B2

(12) United States Patent
Härdtle et al.

(10) Patent No.: US 6,687,586 B2
(45) Date of Patent: Feb. 3, 2004

(54) EVALUATION OF TRANSMISSION DATA

(75) Inventors: Wilhelm Härdtle, Markdorf (DE); Christoph Rüchardt, Bodolz (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/988,790

(22) Filed: Nov. 21, 2001

(65) Prior Publication Data

US 2002/0077730 A1 Jun. 20, 2002

(30) Foreign Application Priority Data

Nov. 22, 2000 (DE) ........................................ 100 57 972

(51) Int. Cl.[7] ................................................ G06F 19/00

(52) U.S. Cl. ........................... 701/30; 701/51; 477/110; 477/169

(58) Field of Search ............................. 701/29, 51, 52, 701/53, 35, 54, 55, 69, 56, 80, 30; 340/439, 459, 438, 441, 461; 477/110, 169, 107, 54, 111, 78, 51, 52

(56) References Cited

U.S. PATENT DOCUMENTS

| | | | | | |
|---|---|---|---|---|---|
| 4,404,639 | A | | 9/1983 | McGuire et al. | 364/551 |
| 4,914,982 | A | | 4/1990 | Ito et al. | 74/844 |
| 4,926,331 | A | * | 5/1990 | Windle et al. | 340/438 |
| 5,642,284 | A | | 6/1997 | Parupalli et al. | 364/424.035 |
| 5,752,211 | A | * | 5/1998 | Takasaki et al. | 180/197 |
| 5,754,965 | A | * | 5/1998 | Hagenbuch | 340/439 |
| 6,246,942 | B1 | * | 6/2001 | Dobler et al. | 477/110 |
| 6,339,749 | B1 | | 1/2002 | Rieker et al. | 702/173 |
| 6,449,884 | B1 | * | 9/2002 | Watanabe et al. | 172/2 |

FOREIGN PATENT DOCUMENTS

| | | | | |
|---|---|---|---|---|
| DE | 31 48 309 | A1 | 8/1982 | G01M/17/00 |
| DE | 31 08 242 | A1 | 11/1982 | G01M/13/02 |
| DE | 34 29 352 | A1 | 2/1986 | G07C/5/08 |
| DE | 42 28 413 | A1 | 3/1994 | G01M/17/00 |
| DE | 693 18 950 | T2 | 10/1998 | G01M/17/00 |
| DE | 198 02 630 | A1 | 9/1999 | G01M/17/00 |
| DE | 38 43 091 | C2 | 11/1999 | G01M/13/02 |
| DE | 199 52 391 | A1 | 6/2000 | G01M/17/00 |
| DE | 100 18 437 | A1 | 10/2001 | G01M/17/00 |

* cited by examiner

*Primary Examiner*—Thomas G. Black
*Assistant Examiner*—Ronnie M Mancho
(74) *Attorney, Agent, or Firm*—Davis & Bujold, PLLC

(57) ABSTRACT

In a method for determining evaluation data for transmissions in vehicles, data is measured in the vehicle via sensors, the measured data is used to form intermediate data specific to the vehicle and then, from the measured data and the intermediate data, evaluation data is determined which is shown, stored or transmitted to a data collecting station.

6 Claims, 1 Drawing Sheet

EVALUATION OF TRANSMISSION DATA

FIELD OF THE INVENTION

The invention concerns a method for determining transmission data.

Many vehicles and parts of vehicles currently contain computer-assisted information and control systems. These usually comprise of a multiplicity of sensors which are positioned at different places in the vehicle, to register different states in the vehicle and effects upon the vehicle and to pass them on as electric signals to a control device. The maintenance of the vehicle and components thereof is subject to constant observation. Necessary servicing of the vehicle is also assisted and favored by including integrated monitoring and servicing indications in the vehicle's electronic control mechanisms. The servicing intervals can thus be arranged flexibly and independently of a single determining parameter such as the number of kilometers covered.

U.S. No. 5,642,284 has disclosed a system for implementing flexible intervals for servicing which detects characteristics of a prime mover of the vehicle and determining therefrom an interval servicing that is adapted to the conditions of the vehicle. But this method and the values determined cannot be used for detecting transmission characteristic values as evaluation data in relation with other components of the drive chain.

The problem on which this invention is based is to present a method for determining values for transmissions of vehicles.

The problem is solved by a method according to the preamble of claim 1. Developments are objects of subclaims.

BACKGROUND OF THE INVENTION

In modern vehicles the transmission control or a superimposed vehicle master controller has available, as result of technical data transmitted through a databus, a variety of signals from different subsystems, such as ABS, ASR, EBS, EDB or retarders which, by applying appropriate algorithms, can be used together with the signals from the transmission for determining the actual and accumulated load of the transmission and auxiliaries thereof.

According to the invention a method is proposed for determining evaluation data for a transmission in a vehicle which includes the steps of measuring data in the vehicle, determining intermediate data from said measured data and then determining evaluation data from the measured data and the intermediate data. In an advantageous embodiment, the intermediate data includes, separately or in combination, the vehicle weight, the tractional resistance, the number of starting operations of the vehicle, the friction work accumulated in the vehicle clutch, the maximum oil temperature that has occurred, or the operation time of the transmission. In one development of the method, the data determined in the transmission controls are stored to be protected against overwriting. In a variant of the invention, the data memory of the transmission control is such that the stored data can only be read via access authorization controls. In one development, the data can be transmitted via telemetry from the vehicle to a central data center or, in another development, can be displayed in the vehicle. The evaluation data for the transmission can be synchronized with evaluation data for other components of the drive chain of the vehicle in order to find an optimized data evaluation moment for several components.

DETAILED DESCRIPTION OF THE INVENTION

Figure 1:
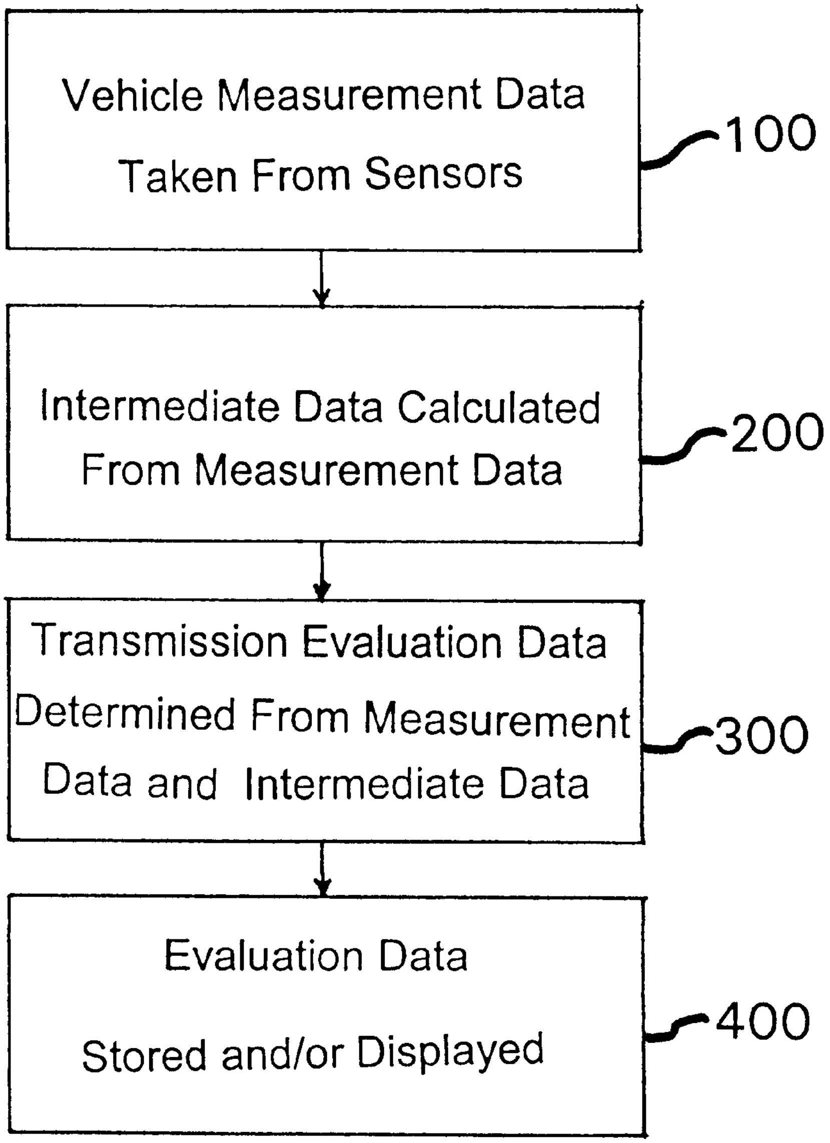
FIG. 1 is a diagrammatic flow diagram showing the method for determining transmission evaluation data for vehicle according to the present invention.

Conventional sensors for the measured values are located in the vehicle in all positions relevant to the technical data. In step 100, with these sensors, a number of data values are measured, including engine torque, engine brake torque, the activation step of an engine brake, the brake torque produced by an additional continuously operating brake, such as a retarder, and the activation step thereof, the actually used gear ratio, or the fuel consumption. Other sensors detect wheel and vehicle velocities, engine rotational speeds, transmission input or transmission output rotational speeds, oil levels, oil quality and oil temperature. Likewise measured is the water temperature, for example, of the engine or of a retarder. The degree of engagement of a clutch and the dwell time of a clutch in an engagement are also sensed, as is the angle adjustment of the accelerator pedal or the transmission temperature.

In step 200 of the method, the intermediate data are determined from the data measured in an electronic computer according to preset and known logical rules. The intermediate data represent the vehicle weight, the tractional resistance, the number of starting operations within a specific period of time, the friction work accumulated in the clutch depending on the degree of the engagement and the dwell periods of the clutch in degree of engagement, the maximum oil temperature that has occurred, the operating time of the transmission, both in specific modes and in interaction with components operating with the transmission.

The measured values and calculated intermediate values are further processed in step 300 to generate evaluation data in the same or another electronic computer, either with each other or with other values received by the sensors according to known logical rules. As such the evaluation data that can be determined includes:

- the driving operations in the different gear steps, that is, the time in which a certain driving step is introduced in relation to the times in which other driving steps are introduced,
- the driving operations separated into driving and coasting torques of the engine or of the engine brake, the times and distances being determined according to torque, rotational speed and gear steps,
- the driving operations in which the vehicle motion uses a retarder or an engine brake,
- the driving operations separated into primary and secondary retarder torques, the time and distances being determined according to torque, rotational speed and gear steps,
- the driving operations in which the vehicle engine operates in a certain part of the characteristic field in order, for example, to detect a consumption-optimized driving mode or to determine the erosion of the lube oil,
- the driving operations in which the vehicle is exposed to certain tractional resistances, including those resulting from the vehicle bulk,
- the driving operations in which the transmission is in the automatic mode,
- the distribution function and time intervals of certain angle adjustments of the accelerator pedal, the distribution of the temperature prevalent in the vehicle, the driving operations in which the vehicle is exposed to certain external environmental influences such as special temperature and air pressure ratios, a factor for evaluating the age of the oil, taking into account the oil temperature, the direct drive power of the transmission and driving operations in which different gear steps are taken into account, a factor for evaluating the load of components close to the transmission such as the clutch load, the retarder load, the clutch engagement duration and the load of the auxiliary output, a factor for evaluating the utilization conditions of the vehicle consisting, for example, of a velocity cycle, a tractional resistance cycle, or a vehicle bulk cycle, a factor for evaluating driving behavior consisting, for example, of an accelerator pedal cycle, driving phases in the manual mode and automatic mode, the engine or the transmission input rotational speed cycle in the manual mode, braking phases using engine braking, and braking phases using the retarder.

The values determined are in step 400 stored in a transmission control memory and can be displayed to the vehicle driver or to other persons, such as maintenance personnel. The data is stored in a manner such that it cannot be manipulated or overwritten by other data. The data can also be stored so that access to the data be controlled and limited to certain groups of persons. Thus the data will always remain intelligible and will provide information about the history of the transmission. The data likewise can be transmitted via telemetry to a service device, a workshop, a customer service, or a device on which the vehicle is managed.

From the evaluation data obtained, conclusions can be drawn as to different operations with respect to the vehicle transmission. The data can document from the process of manufacture of the transmission and thus can show the cause of damages in the transmission. The actual time or the actual datum is detected at regular intervals and stored in the memory of the transmission control. It is possible to verify a change of the transmission controller by the stored data entries. Optimized times for servicing and times for change of lubricants can be determined which take into account the actual particulars of a multiplicity of pieces of information and do justice to load and utilization. On the basis of the evaluation data it is also possible to plan a decisive preventive change of particularly highly loaded components or even of the whole transmission. Also possible is a synchronization with other vehicle systems and the evaluation data thereof which can be stored in a vehicle or in a vehicle master. It is hereby made possible to optimize usefulness and reduce costs. In cases of guaranty and claims, the detection and storage of data in a manner that is prevented against overwriting makes available information that allows a reliable assessment of the existing data for the operational cycle and for the transmission load. A misuse of the components is detectable and intelligible. Terms of a guaranty dependent on utilization and load can be deduced from the information. The data can also be a basis for determining load cycles for use in future developments of transmissions and related components.

What is claimed is:

1. A method for determining transmission evaluation data for a vehicle, the method comprising the steps of:

measuring vehicle data via a plurality of sensors;

forming intermediate data, specific to the vehicle, from the measured data;

determining the transmission evaluation data for the vehicle from the measured data and the intermediate data; and calculating a transmission servicing interval based on the transmission evaluation data, the intermediate data is calculated from the measured data and the intermediate data comprises:

a weight of the vehicle, a tractional resistance of the vehicle, a number of starting operations of the vehicle, a friction work accumulated in a clutch of the vehicle, a maximum oil temperature, and an operating time of the transmission of the vehicle.

2. The method for determining transmission evaluation data according to claim 1, further comprising the step of only allowing an authorization control to access a transmission control date memory.

3. The method for determining transmission evaluation data according to claim 2 further comprising the step of transmitting the data via telemetry from the vehicle to a central data center.

4. The method for determining transmission evaluation data according to claim 2, further comprising the step of displaying the data via a display of the vehicle.

5. The method for determining transmission evaluation data according to claim 2 further comprising the step of synchronizing the evaluation data of the transmission with evaluation data of other drive components of the vehicle.

6. A method for determining transmission evaluation data for a vehicle, the method comprising the steps of:

obtaining measured data via a plurality of sensors measuring at least a degree of engagement of a clutch and a dwell time of the clutch in the engagement;

forming vehicle transmission specific intermediate date from the measured data, the intermediate data comprising at least a friction work accumulated in the clutch of the vehicle according to the degree of engagement of the clutch and the dwell time of the clutch in the engagement;

determining at selected time intervals the transmission evaluation data for the vehicle from the measured data and the intermediate data;

storing the data in a transmission control data memory such that the data is prevented against overwriting;

obtaining indications of damage and wear of the transmission from the stored transmission evaluation data; and calculating a transmission servicing interval based on the indications of damage and wear of the transmission from the stored transmission evaluation data.

* * * * *